United States Patent [19]

Suzuki

[11] 4,011,128

[45] Mar. 8, 1977

[54] APPARATUS FOR FORMING A CROSS-ORIENTED FILM

[75] Inventor: Shigemasa Suzuki, Toda, Japan

[73] Assignee: Nippon Ekika Seikei Kabushiki Kaisha, Tokyo, Japan

[22] Filed: July 17, 1975

[21] Appl. No.: 596,670

Related U.S. Application Data

[63] Continuation-in-part of Ser. No. 553,274, Feb. 26, 1975, which is a continuation of Ser. No. 287,855, Sept. 11, 1972, abandoned.

[30] Foreign Application Priority Data

Sept. 9, 1971 Japan .............................. 46-69233

[52] U.S. Cl. .............................. 156/500; 156/244; 264/95; 264/177 R; 425/325; 425/326 R; 425/328; 425/391; 425/393

[51] Int. Cl.² ........................................ B29D 23/04

[58] Field of Search ................. 156/198, 244, 500; 264/88, 93, 94, 95, 173, 176 R, 177 R, 209, 210 R, 290 R, 291; 425/94, 131.1, 133.1, 325, 326 R, 328, 378 R, 380, 387 B, 391, 392, 393

[56] References Cited

UNITED STATES PATENTS

| | | | |
|---|---|---|---|
| 3,142,092 | 7/1964 | Ralston | 425/326 |
| 3,296,343 | 1/1967 | Buttolph | 425/326 |
| 3,635,634 | 1/1972 | Nagano et al. | 264/95 |
| 3,807,076 | 4/1974 | Bridge | 425/391 |
| 3,891,374 | 6/1975 | Ninomiya et al. | 264/95 |

*Primary Examiner*—Caleb Weston
*Attorney, Agent, or Firm*—Oblon, Fisher, Spivak, McClelland & Maier

[57] ABSTRACT

An apparatus for forming a cross-oriented film which apparatus includes a device for maintaining the temperature of a thermoplastic synthetic resin tubular film below the melting point, and above the secondary transition temperature thereof, a twist-preventing device for pressing and feeding the tubular film in the film-forming direction, a cross-orientation device for holding the tubular film and for rotating the same, while vertically disposed, relative to the film-forming direction at a peripheral speed two or more times as fast as the feeding speed of the twist-preventing device, and a take-up device for successively flattening the tubular film into two layers.

2 Claims, 9 Drawing Figures

APPARATUS FOR FORMING A CROSS-ORIENTED FILM

CROSS-REFERENCE TO RELATED APPLICATIONS

This is a Continuation-In-Part application of application Ser. No. 553,274, filed Feb. 26, 1975 which is a Continuation application of application Ser. No. 287,855, filed Sept. 11, 1972, now abandoned.

BACKGROUND OF THE INVENTION

1. Field of the Invention

The present invention relates generally to cross-oriented films, and more particularly to a method and apparatus for the formation of such type of films from a thermoplastic synthetic resin.

2. Description of the Prior Art

Heretofore, a uniaxially oriented film such as for example, an oriented tape, has exhibited the disadvantage of tearing easily in a lateral direction, while a biaxially oriented film has various problems associated with its production speed, as well as orientation magnification, in the case of a tubular method, and with expensive and complex methods and apparatus for gripping both ends of the film in the case of a tenter method. In addition, biaxially oriented films also generally exhibit poorer mechanical properties, with lower orientation magnification, than is obtained with uniaxially oriented films.

A method of laminating a uniaxially oriented film with the orientations disposed perpendicular to each other is generally known, as is a method which includes the steps of supplying a uniaxially oriented film at an inclined angle so as to enable it to be wound in a spiral fashion and then laminating the same in a flat manner so as to utilize the features of the uniaxially oriented film and also for compensating for the disadvantages thereof. These materials are not however, commercially acceptable at the present time because of the undesirable exposure of the seam within the finished film.

SUMMARY OF THE INVENTION

One characteristic feature of the method of the present invention is the formation of a cross-oriented film by means of adjusting the temperature of a tubular film, produced by means of a conventional method, such as for example, an inflation tubular method from an extruder, to the orientation temperature of the resin used while applying an orientation tension in the film-forming direction and moving the film in the film-forming direction, continuously imparting a cross-orientation to the film at an inclined angle of between 15°-89°, and which is preferably 45°, with respect to the film-forming direction so as to thereby substantially spirally orient the entire tubular film, flattening the tubular film into two layers which are thus obliquely oriented and laminating the film in the cross-oriented manner by means of coating the two layers with an adhesive and pressing the same together so as to seal the film.

Another feature of the present invention is the provision of an apparatus for forming a cross-oriented film which has a temperature-adjusting device for adjusting the temperature of a tubular film, produced by means of a well known method, to the orientation temperature thereof while feeding the tubular film in a film-forming direction at a speed slightly faster than the film-forming or feeding speed, a twist-preventing device for preventing the tubular film from slipping with respect to the cross-orientation tension caused by means of the stretching and rotation thereof, a cross-orientation device for rotating the tubular film with respect to the film-forming direction or laterally thereof at a peripheral speed two or more times as fast as the feeding speed while holding the tubular film by means of a rotary mandrel inserted therein, and if necessary, by means of external rotary rolls for obliquely moving the tubular film from a position external thereof, and a take-up device comprising guide rolls, nip rolls, and the like, for successively flattening and pinching the tubular film into two layers while imparting a stretching speed, of two or more times as fast as the tubular film feeding speed of the twist-preventing device, to the cross-orientation device.

Still another feature of the present invention is the production of an extremely bulky cross-oriented film, as a result of twisting and orienting the film, by means of the aforementioned method and apparatus, with a foamed substance or a filler-contained foamed substance within the resin of the tubular film.

A further feature of the present invention is the production of a cellular cross-oriented film, containing fine pores and/or gas-permeable pores, by means of the aforementioned method and apparatus with a filler mixed within the resin of the tubular film.

There are many patent references which are concerned with orientation methods, such as for example, conventional tubular and tenter methods, however, there is no prior art disclosing the method and apparatus of the present invention. Only Japanese Patent Publication No. 5319/1965 discloses a method of producing a cross-oriented film at an inclined angle of 45°, which method however, involves the production of a cross-oriented film by obliquely cutting a uniaxially oriented tubular film in the film-forming direction along the tubular periphery of the film. It has also been proposed to rotate the film-forming die of an extruder, together with the tubular film to be formed, since it is necessary to rotate the tubular film in order to continuously cut the uniaxially oriented film at the oblique angle. That is, such application discloses the method and apparatus for producing the objective article by rotating the extrusion die together with the tubular film in order to obtain a cross-oriented film by means of continuously and obliquely cutting a conventional uniaxially oriented tubular film, such as for instance an oriented tape, which is uniaxially oriented in the film-forming direction.

The present invention involves an improvement over such conventional methods and apparatus in respect to the method of supplying the tubular film and of cross-orienting the same in that the present invention uses a non-oriented tubular film, formed by the conventional method, without any rotation of the extruder or extrusion die and the film is cross-oriented by stretching and twisting the tubular film without cutting it. In addition, the cross-oriented tubular film thus produced is flattened so as to continuously form a laminated cross-oriented film. Thus, the method of the present invention is an easy and simple industrial process of film-forming, and is capable of continuously forming the cross-oriented film in an easy and accurate manner.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

Figure 1:
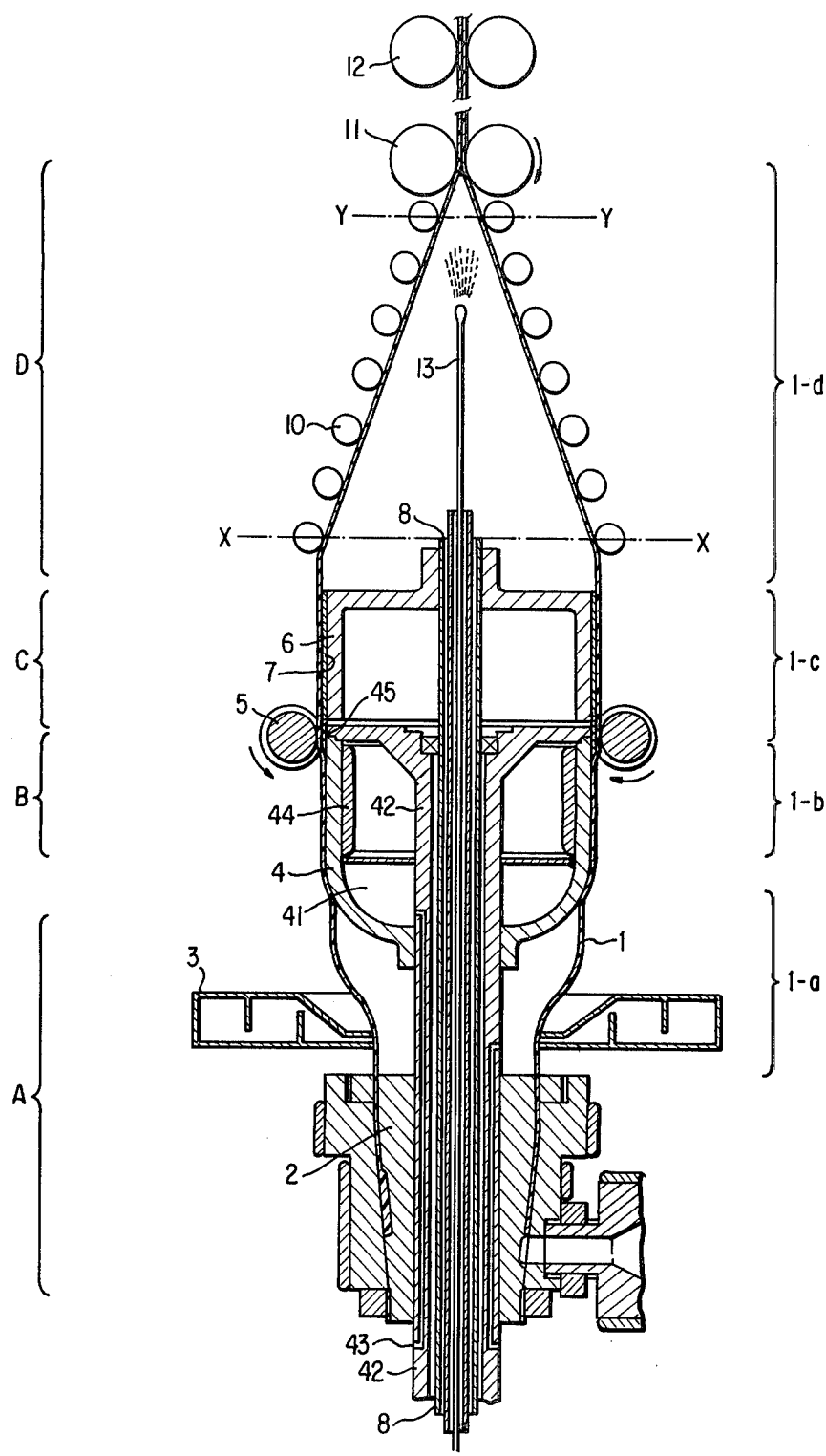
FIG. 1 is a schematic, longitudinal cross-sectional view of an embodiment of the apparatus constructed in accordance with the present invention, and showing its cooperative parts.

Reference now being made to the drawings, and more particularly to FIG. 1 thereof, which shows one embodiment of the apparatus of the present invention, a tubular-film producing device, generally indicated by the reference character A, adopts a well-known extrusion inflation method for producing a tubular film. A molten tubular film 1, extruded from an annular orifice of a tubular or inflation die 2 mounted upon an extruder, is cooled by means of a cooling ring 3 and the film 1 is then fed to a twist-preventing device, generally indicated by the reference character B.

As an alternative, a flattened tubular film, continuously wound around a roller or the like, is expanded by means of blowing air therein to form a tubular film, and, using pinch rollers or the like, is fed to the twist-preventing device B after it has been heated to the orientation temperature.

The tubular film portion 1-a is the same as a film section produced by means of a conventional tubular method which extrudes and draws a film within its molten state, that is, at a temperature which is higher than the crystallization temperature, and cools the film while maintaining the same at a speed which is the same as the drawing speed.

Within the twist-preventing device B, the tubular film 1 is passed around a fixed mandrel 4 whereby the internal pressure of the tubular film 1 is to be different within the portions 1-a and 1-c thereof. For this purpose the fixed mandrel 4 is made to be larger in diameter by an amount of 3–15% than the maximum diameter of the blown tubular film within the portion 1-a so as to thereby forcefully mechanically pressurize the internal surface of the tubular film 1 by stretching the same.

In addition, a number, preferably three or more, of closely spaced feed rolls 5 are provided within a single horizontal plane upon the outer periphery of the fixed mandrel 4, or alternatively, may be disposed within two vertically spaced planes, for pressing the tubular film 1. By means of these feed rolls 5, the tubular film 1 is fed in the film-forming direction at a speed of 0–10% faster than the film-forming speed of the extrusion orifice 2 while being pinched or pressed. Each of the feed rolls 5 is preferably a roller having a concavely curved outer surface disposed along and in contact with the tubular film 1, as shown for example within FIG. 3a, and in addition a large-diameter and smooth portion 45 is provided upon the outer peripheral portion of the fixed mandrel 4 which corresponds to the plane of the feed rolls 5 in order to improve the operational efficiency thereof.

Thus, the twist-preventing device B prevents the rotational action and high drawing speed, that is, the cross-orientation tension, created by means of the cross-orientation device, generally indicated by the reference character C, from being transferred or transmitted to the tubular film within the molten state and undesirably adjusting or altering the temperature thereof, the device B per se in fact adjusting the tubular film 1 to a temperature suitable for orientation.

The terms "a temperature suitable for orientation" or "orientation temperature" as used herein, mean that temperature of the thermoplastic synthetic resin forming the tubular film 1 is below the melting point and above the secondary transition temperature thereof, and within this range, it is easy to effectively orientate the tubular film.

As just noted, the fixed mandrel 4 includes means for adjusting the temperature of the tubular film 1 to the orientation temperature. For example, a cooling portion 41 is provided within the portion of the fixed mandrel 4 at which the tubular film portion 1-a first comes into contact with the fixed mandrel 4, as shown in FIG. 1. Cooling water, hot water, hot oil, or the like, may be circulated through a recirculation passage 43 provided within a strut 42 of the fixed mandrel 4, and a heater 44, electrically wired through means of the strut 42, is provided directly above the cooling portion 41 so as to adjust the surface of the fixed mandrel 4 to the orientation temperature which thereby adjusts the tubular film portion 1-b, disposed in contact with the surface of the mandrel 4, to the orientation temperature.

Thus, the tubular film 1 reaches the orientation temperature when it is fed to the twist-preventing device B and it is also noted that within the region preceding the twist-preventing device B, the tubular film is fed at a rate of speed which is approximately the same rate of speed as the film-forming speed.

Within a conventional film forming method, the tubular film produced is cooled and taken up while being rotated within the molten state, or in other words, at a temperature above the crystallization temperature, in order to improve the uniformity of the inflated tube taken up. This process corresponds to the process which takes up the tubular film at the portion 1-a within the tubular film-producing device A of the present invention while simultaneously rotating the same, however such a process is completely different from that of the present invention since the process of the present invention cross-orients the tubular film by means of stretching and rotating the same at the orientation temperature, that is, at a temperature which is below the melting point or crystallization temperature, and therefore the film-forming direction and speed are not altered until the tubular film is adjusted to the orientation temperature within the twist-preventing device B.

Within the cross-orientation device C, a rotary mandrel 6 is provided and disposed above the fixed mandrel 4 so as to be adjacent thereto. The outer periphery of the rotary mandrel 6 is greater than that of the fixed mandrel 4 by 0–30% and is in pressurized contact with the internal surface of the tubular film 1 as a result of the stretching of the film thereover. If necessary, the rotary mandrel 6 is provided with equally spaced bulged or ribbed portions 7, of 3mm or less, and preferably of 1mm or less, in thickness, formed or aligned in the film-forming or longitudinal axial direction. The rotary mandrel 6 is fixed to a rotary shaft 8 which passes through the central axial portion of the fixed mandrel 4 and the annular orifice 2, and is rotated through means of a transmission gear, not shown, provided below the strut 42 of the fixed mandrel 4.

When the tubular film 1, at the orientation temperature, reaches the cross-orientation device C, the same is drawn in the film-forming direction by means of nip rolls 11 of the take-up device D at a speed two or more times as fast as the speed at which the tubular film 1 is fed in the film-forming direction by means of the feed rolls 5 associated with the fixed mandrel 4. Simultaneously therewith, the tubular film 1 is given a lateral rotation as a result of the rotation of the rotary mandrel 6 and is thereby substantially given a cross or twist-orientation. For example, when the peripheral speed of the rotary mandrel 6 and the drawing speed are the same, a cross-oriented film at an inclined angle of 45° can be produced.

In this case, the tubular film 1 in contact with the outer periphery of the rotary mandrel 6 is required to traverse a translatory sliding movement in accordance with the taking-up or drawing action in the film-forming direction and to also be moved laterally without sliding upon and relative to the rotary mandrel 6. In order to accomplish this purpose, the diameter of the rotary mandrel 6 may be made greater than the internal diameter of the tubular film 1 by 10–30% and the outer surface of the rotary mandrel 6 may also be made rough, thereby causing the rotary mandrel 6 to be in stressed contact with the tubular film.

Figure 2A:
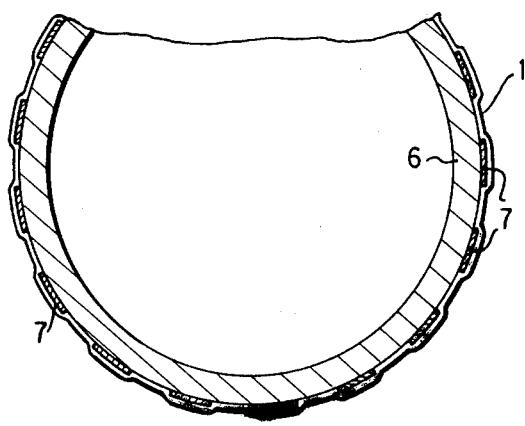
FIGS. 2a and 2b are plan and elevational views, respectively, of a rotary mandrel provided with bulged or ribbed portions thereon.
Figure 2B:
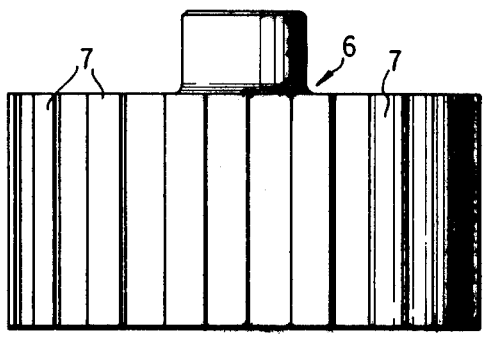

As a further expedient in achieving this purpose more positively, longitudinal or axially extending bulged or ribbed portions 7 are provided upon the outer periphery of the rotary mandrel 6 as shown in FIG. 2, and thus the flexible tubular film portion 1-c is made to come into close contact with the outer periphery of the rotary mandrel 6 and in fact enters the longitudinal grooves formed or defined between the bulged or ribbed portions 7 as a result of the action of the drawing force of the nip rolls 11 of the take-up device D and the inherent or natural shrinking force of the tubular film 1. In this manner, then, the tubular film 1 is caught by means of the bulged portions 7 and can thereby be positively moved in the lateral direction and, in addition, can be smoothly slid in the film-forming or take-up direction, because the grooves are longitudinally aligned.

Figure 3A:
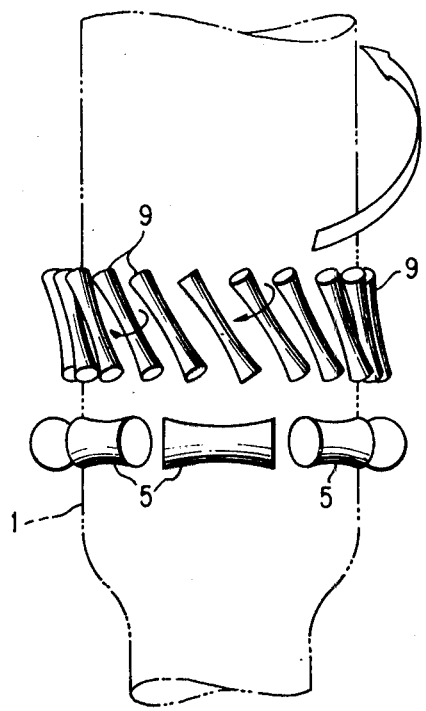
FIGS. 3a, 3b and 3c are views diagrammatically illustrating the function of the rotary roll structure provided in accordance with another embodiment of the present invention.
Figure 3B:
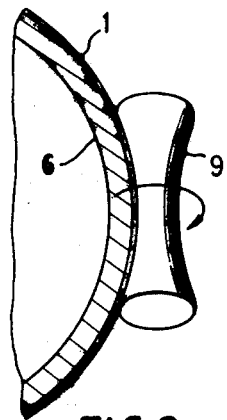
Figure 3C:
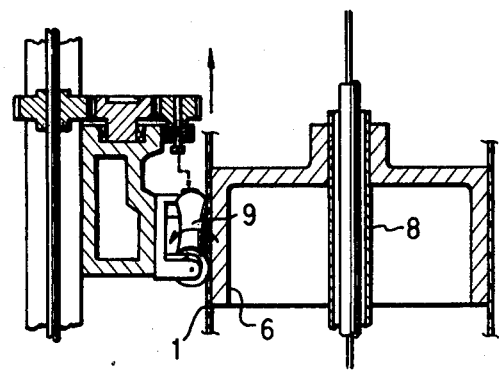

As an alternative means for achieving the aforenoted operation, there may be provided a plurality of external rotary rolls 9, as shown in FIG. 3, each having a concavely curved surface and there are no bulged portions 7 upon the rotary mandrel. As shown within FIGS. 3a and 3b, the external rotary roll 9 is in contact with the tubular film in an oblique manner relative thereto, and as shown within FIG. 3a, a plurality of the external rotary rolls 9 are disposed in a uniplanar array around the periphery of the tubular film 1 and in contact therewith. As shown within FIG. 3c, the rotary rolls 9 are rotated at the same peripheral speed as that of the rotary mandrel 6, and thus the rotary rolls 9 and the rotary mandrel 6 cooperate to pinch and feed the tubular film 1 so as to thereby cross-orient the same.

As noted within the above examples, the tubular film portion 1-c is drawn by means of the nip rolls 11 of the take-up device D and is oriented obliquely or preferably at an inclined angle of 45° relative to the feed direction, as a result of the action of the rotary mandrel 6 and/or the external rolls 9. Thus the tubular film 1 along the entire peripheral area thereof is substantially spirally oriented and is subsequently fed to the take-up device D.

The take-up device D may comprise guide rolls or a stability plate, and nip rolls similar to the take-up device, all of which are utilized in a manner similar to that of the conventional inflation tubular technique. However, in order to prevent wrinkling of the tubular film and to produce a correctly cross-oriented film, the guide rolls 10 are rotated at the same speed as the feeding or drawing speed of the tubular film 1, and the film is engaged within screw thread-type grooves provided within the guide rolls 10 as a result of the internal pressure of the tubular film portion 1-d. These grooves are formed so as to be 5mm or less in depth and have a smooth spiral thread disposition which includes a twisting angle corresponding to that of the tubular film 1, so as to in fact feed the tubular film at the desired twisting angle.

These guide rolls 10 are disposed symmetrically with respect to the film apparatus as in the usual case, however, it is also required to orient the directions of the threaded grooves and rotation of the rolls 10 so that the tubular film 1 in contact with the guide rolls 10 may be properly twisted. As shown within FIGS. 4a and 4b, as the tubular film 1 is flattened, the contacting area of the tubular film 1 with the guide rolls 10 is increased, and thus the tubular film 1 is fed in the film-forming direction while being simultaneously subjected to a twisting action. Therefore, several pairs or sets of oppositely disposed rolls are provided as the guide rolls.

The nip rolls 11 and 12 may be of the conventional type, and may preferably be larger in diameter than the parallel disposed guide rolls 10. The nip rolls 11 are provided adjacent to the final pair of parallel guide rolls 10, and thus, the front and back portions of the obliquely orientated tubular film become obliquely, and at a right angle with respect to each other in the case of a 45° orientation relative to the feed direction, oriented to each other, and subsequently are pinched, pressed, and flattened between the nip rolls 11 so as to become a cross-oriented laminated film. Between the final parallel guide rolls 10 and the nip rolls 11, there may also be provided pressing and stabilizing rolls having similar diameters and no spiral grooves.

Figure 4A:
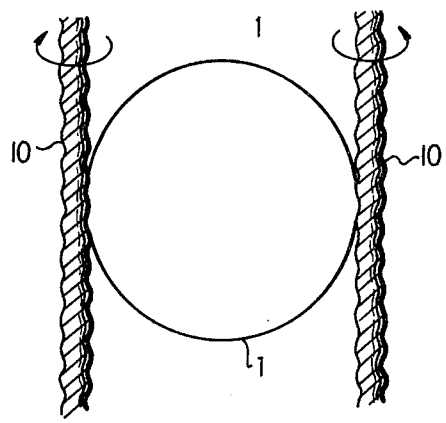
FIGS. 4a and 4b are horizontal cross-sectional views of the apparatus of FIG. 1 showing the relationship between the tubular film and the guide rolls for twisting the tubular film while flattening the same, and taken along the lines X—X and Y—Y within FIG. 1, respectively.
Figure 4B:
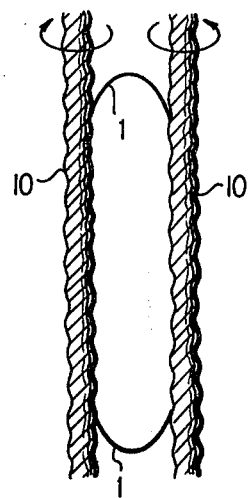

The above-mentioned take-up device D thus flattens and presses the tubular film 1 while drawing the cross-oriented film portion at a speed two or more times as fast as the feeding speed of the twist-preventing device B thereby changing the shape of the tubular film from the state within portion 1-a of FIG. 1 and that shown within FIG. 4a to the state shown within FIG. 4b. Subsequently, the device D completely flattens the tubular film 1 into two layers by means of nip rolls 11 so as to form a cross-oriented film. If the tubular film is oriented at an inclined angle of 45°, a right-angled cross-oriented film of an inclined angle of 45° can be produced.

Figure 5:
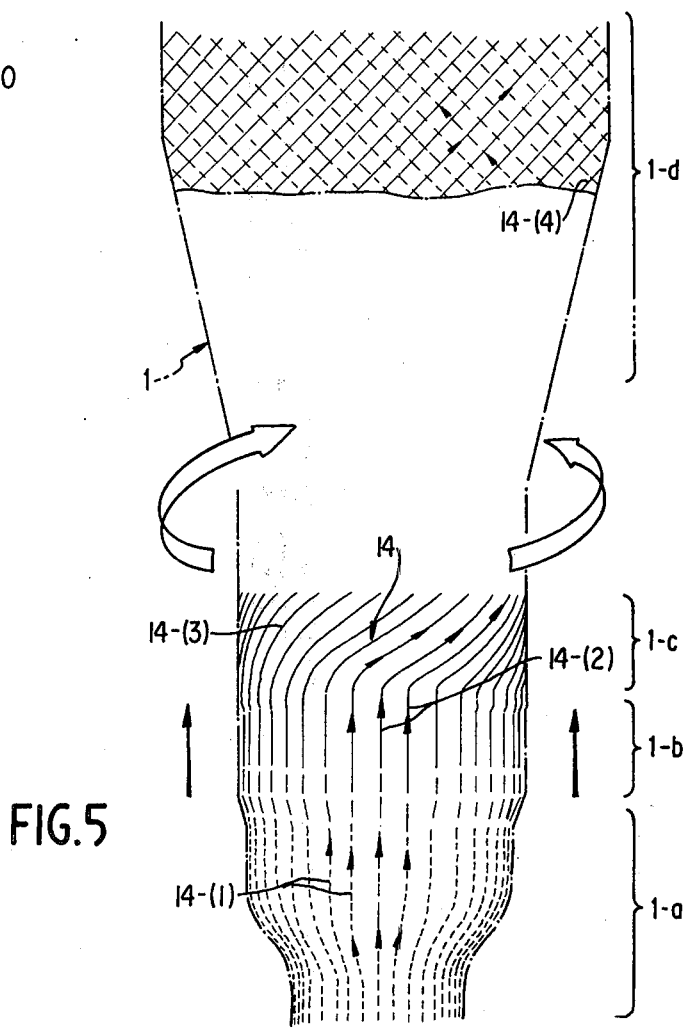
FIG. 5 is a schematic diagram illustrating the process of the present invention.

As mentioned above, the tubular film 1 is successively changed in shape, as shown by the film portions 1-a, 1-b, 1-c and 1-d, by means of the tubular-film-producing device A, the twist-preventing device B, the cross-orientation device C and the take-up device D. This process will be hereinafter further described in detail with reference to FIG. 5.

The extruded tubular film 1 is cooled from the molten state and is blown or inflated during the portion 1-a, so as to be fed in the film-forming direction in the molten state, that is, above the crystallization temperature thereof. The path of a given point 14 upon the tubular film 1, in accordance with the aforenoted process of the present invention, may be shown by any one of the dotted lines 14-(1). The film 1 subsequently reaches the orientation temperature when moving over the fixed mandrel 4 and the path of the point 14 within this stage of the process is shown by one of the thickened solid lines 14-(2). Up to this point, the tubular film 1 is fed at the same speed and in the same direction as that of the film-forming mechanism without applying a drawing force in the film-forming direction, all in a manner similar to that of conventional film-forming techniques.

The tubular film 1 having reached the orientation temperature however, is subsequently cross-oriented at a drawing speed of two or more times as fast as the film-forming speed existing at the boundary between the portions 1-b and 1-c. Under these conditions, the tubular film 1 is cross-oriented at an inclined angle of 45° and the path of the point 14 within this stage of the process is shown by means of any of the thin solid lines 14-(3). The tubular film 1 is passed through the nip rolls 11 of the apparatus portion 1-d so as to become a laminated cross-oriented film, and the directions of orientation of the front and rear layers of the laminated cross-oriented film are shown by the solid and dotted lines 14-(4), respectively.

In other words, the present invention does not involve a method of producing a film which is merely monaxially oriented in the film-forming direction as a result of conventional techniques, but to the contrary, the present invention is concerned with a novel method of producing a spirally cross-oriented tubular film by means of a technique which rotates a tubular film, adjusted to the orientation temperature, while drawing the same so as to thereby continuously spirally cross-orient the tubular film obliquely, preferably at an inclined angle of 45°. The Japanese Patent 5319/65 merely teaches a monaxially oriented tubular film and a method of producing a cross-oriented film by obliquely cutting the monaxially oriented tubular film, and therefore, this patent is completely different from the present invention in the orientation technique.

Among the methods of laminating and bonding the cross-oriented film so as to form a complete cross-oriented laminated film, there is one method which laminates and bonds the cross-oriented film during the intermediate steps in the apparatus, and there is another method which envisages treating two contacting films by cutting along both sides of the cross-oriented film after the film has passed through the nip rolls 11.

The method of forming a laminated cross-oriented film during the intermediate steps in the process utilizes nip rolls 12 of the same type as that of the nip rolls 11. Within this method, twist is given to the film at an inclined angle greater than required. For example, when a 45° cross-oriented film is to be produced, the film is cross-oriented at an inclined angle of 50°–89° with respect to the film-forming direction. This film thus over-twisted is pressed by means of the nip rolls 11 and is drawn between the nip rolls 11 and the nip rolls 12 in the film-forming direction so as to compensate for the angular difference.

Within the aforenoted method, the cross-oriented film is laminated, by means of orientation and pressure, by raising the nip pressure of the nip rolls 11 and/or the nip rolls 12, and applying a lower temperature, between the rolls and the nip rolls, which is higher than the orientation temperature yet lower than the melting point. An adhesive is applied to the inner surface of the tubular film 1 by means of an injection device 13 supported by means of a post which projects from the center of the annular die 2, or by transferring the adhesive, near the final position of the guide rolls 10, the tubular film then being pressed by means of the nip rolls 11 and 12 so as to form a laminated film. The lamination may sometimes be achieved by use of the nip pressure alone, and the above methods may be used singly or in combination.

Among the methods for laminating and bonding the tubular film by means of cutting both sides thereof, there is a method which cuts the laminated film upon both sides thereof, between the nip rolls 11 or 12, or after being taken up, and applies an adhesive to the contact surface of the two layers. There is also a method which utilizes a resin, high in adhesion force, which can be melted and formed into a film below the orientation temperature, and there is still further, a method which inserts, for example, an extra-thin ethylenevinyl acetate (EVA) film between the adhering surfaces of a polyolefin cross-oriented film wherein the annealing temperature of the polyolefin film and the thermal molten sealing property of the EVA film occur simultaneously and at the same temperature so as to form an adhesive film. Still other conventional adhering, coating and laminating methods are available, and some methods may even include conventional treatments for improving the adhesiveness of the film, such as for example, roughening of the adhering surfaces and oxidation treatments.

Thermoplastic synthetic resins used within the present invention include, for example, olefin resins such as polyethylene and polypropylene; vinyl and vinylidene resins such as polyvinylidene, polyvinyl chloride, polyvinyl alcohol or polystyrene; ester resins such as polyethylene terephthalate; polyamide resins such as nylon; acetal resins; acrylic resins such as polyacrylonitrile; or general thermoplastic synthetic resins including copolymers, blends, and cross-linked modified resins of the above resins, and including fillers, fibres, foaming agents, elastomers, elastics, and other additional agents.

If a cross-oriented film is formed as aforenoted, using the method and apparatus of the present invention, with a filler added to the resin forming the tubular film 1, it is found that the resin forms a cross-oriented film within which fine air pores and/or air permeable pores are generated throughout the film. This is considered to be due to the fact that the fine fillers contained within the resins create a flow resistance to the resin being rotated, oriented and flowed.

In such a case, the filler particles are preferably less than 10 microns, or more particularly 3 microns, in diameter and particles, such as for example, inorganic and organic filler substances, for example, talc, clay, asbestos, aluminum hydroxide, alumina, calcium carbonate, diatomaceous earth, silica and alumino-silicates (as inorganic materials); powder of pulp, powder of synthetic resins as organic material, and pulp, cotton threads, straw, fibre glass, and synthetic fibre, as suitable fibres, are used. The cros-orientated film mixed with more than 30%. wt, or preferably 50%. wt, of fine filler materials has printing and writing properties similar to those of conventional cellulose paper, and is light, strong, and waterproof, and may be utilized as packaging and non-woven cloth materials.

If a foaming agent or a foaming agent and filler is mixed with the resin for forming the tubular film 1 so as to form a tubular foam film and the cross-oriented film is formed similar to that noted hereinabove and using the method and apparatus of the present invention, a porous and bulky cross-oriented film can be obtained. As the foaming agent, decomposition type foaming agents, such as for example, azodicarbonic amide, and solvent type foaming agents, may be used.

A film having a strong orientating effect cannot be obtained at high drawing rate and high speed by biaxially-orienting techniques of conventional tubular methods unlike the uniaxially oriented tape. There is no method of continuously obtaining the cross-oriented film by both the tubular and tenter techniques utilizing uniaxial orientation only. However, according to the present invention, biaxially cross-oriented film is continuously produced by means of twisting and orienting the film in a uniaxial direction at high speed and high drawing rate, thereby providing a strong packaging film.

Since the present invention does not need the conventional inflating step in order to stretch the tubular film laterally, that is, to expand the width thereof by blowing, which is unlike the orientation technique of the tubular method, the cross-oriented film of an air permeable or net structure, such as for example, an air-pore generated film, may be obtained by improving the tubular uniaxially orienting method and apparatus, and thereby a non-woven synthetic paper may be easily obtained. More particularly, great industrial advantages are presented by means of a product which requires strength and air-permeability.

Furthermore, the present invention may produce a film which has the added advantage of a uniaxially oriented film in that high orientation may be obtained by orienting a high crystalline polymer at a high drawing rate. Air-permeable, net, and foaming films may also be produced, and still further, rigid structural material is obtainable by means of laminating the film in several layers. Particularly, light, less expensive, and rigid structural material, may be obtained by properly laminating foamed cross-oriented films, air permeable or air-pore contained cross-oriented films and normal cross-oriented films.

The following Examples are given by way of illustration only, and not limitation:

EXAMPLE 1

0.3 parts by weight of lubricant, polyethylene wax (a low polymer amorphous PE of Mitsui Petroleum Chemical Co.), and 1.5 part by weight of stearic acid were mixed with 100 parts by weight of high density polymethylene (containing Highzex No. 7000F, $d = 0.965$, $MI = 0.05$ of Mitsui Petroleum Chemical Co.) by means of a Henschel mixer (made by Ishikawajima Harima Heavy Industry Co.), and while the mixture was blown by means of a 50 m/m extruder mounted with a circular die 200 mm in diameter in accordance with the apparatus of FIG. 1, a tubular film of 200 mm in diameter was formed at a rate of 4 m/minute, and was fed to a twist-preventing device B which feeds the tubular film at 4.1 m/minute, 280 mm in diameter and at $100°\pm2°$ C.

Equally-spaced longitudinal bulged portions 7, formed of kraft paper 0.5 mm thick and 10 mm wide, were provided upon the outer peripheral surface of a rotary mandrel 6,300 mm in diameter, and the rotary mandrel 6 was rotated at a peripheral speed of 15 m/min. Smooth spiral grooves, 3 mm in depth, were formed at an inclinded angle of 45° upon the guide rolls 10 and the guide rolls 10 were rotated at a peripheral speed of 15 m/min, the tubular film being interposed between the nip rolls 11 at a peripheral speed of 15 m/minute so as to form a cross-oriented film. Both sides of the tubular film were slit and 20 microns of ethylene-acetate copolymer resin (H2011 containing 15 wt% of evatate vinylacetate of Sumitomo Chemical Co.) was inserted between the contacting surfaces of the two layers. The tubular film was then pressurized at $115°\pm1°$ C. by means of the nip rolls 12, and after cooling, the tubular film was rolled up.

This cross-oriented film has remarkable properties in comparison with a conventional film of the same resin and the effect of the cross-orientation was quite apparent. As one example, tension and elongation were listed at 25° C. or room temperature using Tensiron (autograph IS-500 of Shimazu Manufacturing Co.) and the following results were obtained:

| | Tension Kg/mm² | Elongation % | Void volume ratio % |
|---|---|---|---|
| Cross-oriented film | 5.4 | 48 | 0 |
| Normal film | 3.3 | 50 | 0 |

Note 1: The tension and elongation is according to ASTM D638.

EXAMPLE 2

Polypropylene (600F of Mitsui Petroleum Chemical Co.): 100 parts by weight
Stearic acid: 2 parts by weight
Heavy calcium carbonate (Whiton SB of Shiroishi Calcium Co.): 20 parts by weight
Silicic acid (White Carbon, Carplex of Shionogi Pharmaceutical Co.): 10 parts by weight
Titanium white (rutile type): 10 parts by weight The above components were mixed by means of a Banbury mixer (made by Nippon Roll Co.), and particulated by means of a pelletizer, and the mixture was blown by means of a 65 mm extruder mounted with a circular die 300 mm in diameter. A tubular film was formed at the rate of 7 m/minute and was 380 mm in diameter. The same was subsequently fed to a twist-preventing device B at which the tubular film was fed at the rate of 7.5 m/minute and at a temperature of $120°$ $C.\pm2.5°$ C., and was formed so as to be 400 mm in diameter.

A rotary mandrel 6 and external rotary rolls 9 similar to those shown within FIG. 3 were rotated at a speed of 30 m/min and six sets of guide rolls 10, having smooth grooves 2.5 mm in depth and formed at an inclined angle of 45°, and nip rolls 11 were disposed in a manner similar to that shown within FIG. 1. They were then rotated at a peripheral speed of 31 m/min. so to cross-orient, flatten, press and wind up the tubular film at a temperature of 120° C±2.5° C.

Adhesive was uniformly coated onto the inner surface of the tubular film from an injection device 13 supported by means of a post projecting from the center of the annular die 2 mounted upon the extruder and the central space of the fixed mandrel 4 and the rotary mandrel 6. The tubular film was flattened by the nip rolls 11 and 12 at a temperature of 125° C±2° C. to obtain the cross-oriented film.

This cross-oriented film also had remarkable properties in comparison with the conventional film of the same resin, and the effect of the cross-orientation was quite apparent. The same tests as those noted within Example 1 were conducted, and thus, the following data was obtained (a normal film contains no filler):

|  | Tension Kg/mm$^2$ | Elongation % | Void volume ratio % |
|---|---|---|---|
| Cross-oriented film | 3.8 | 150 | 38 |
| Normal film | 3.5 | 600 | 0 |

EXAMPLE 3

Polyvinyl chloride [Denka (Registered Trade Mark) vinyl M90 of Tokyo Electrochemical Co.]: 100 parts by weight
Heavy calcium carbonate (White SB of Shiroishi Calcium Co.): 100 parts by weight
Titanium oxide (rutile type): 10 parts by weight
Sulfur-containing organic tin stabilizer (KS-41 of Kyodo Pharmaceutical Co.): 3 parts by weight
Lead stearate (made by Toa Rika Co.); 1 part by weight The above components were mixed by means of a Banbury mixer (made by Nippon Roll Co.), and using the device of Example 1, the mixture was extruded at the same diameter and speed to the twist-preventing device B, and subsequently, the tubular film was fed from the rotary mandrel 6 to the nip rolls 11 at a peripheral speed of 8.2 m/minute so as to give the film a drawing rate of two times that of Example 1 and a 45° twisting angle at a temperature of 90° C±3° C. so as to thereby obtain a cross-oriented film. Subsequently, both sides of the tubular film were cut, and adhesive was coated to 10 microns in thickness between the two films, that is, upon the contacting surfaces thereof. The film was then fed to the nip rolls 12 at a temperature of 95° C±2° C., and after cooling, the film was rolled up.

This cross-oriented film had the following superior properties in comparison with the normal film of the same resin and the same filler used to form the film:

|  | Tension Kg/mm$^2$ | Elongation % | Void volume ratio % |
|---|---|---|---|
| Cross-oriented film | 3.2 | 24.0 | 33 |
| Normal film | 0.8 | 7.2 | 0 |

This data was obtained according to the tests noted in connection with Example 1.

EXAMPLE 4

Polystyrene (Esbrite GP8 of Showa Electric Co.) was oriented by the same method and apparatus used in Example 1 at a temperature of 100° C±2° C., the orientation temperature, so as to obtain the cross-oriented film. The effect of the orientation was remarkably similar to that of Example 1.

EXAMPLE 5

Nylon 6 (made of Toyo Rayon Co.) was formed into a tubular film at a temperature between 250° C – 260° C. and was oriented by the same method and apparatus used in Example 1 at a temperature of 110° C±2° C., the orientation temperature, so as to obtain the cross-oriented film. The effect of the orientation was remarkable, as in the case of Example 1.

Obviously, many modifications and variations of the present invention are possible in light of the above teachings. It is to be understood therefore that within the scope of the appended claims, the invention may be practiced otherwise than as specifically described herein.

What is claimed as new and desired to be secured by letters patent of the United States is:

1. An apparatus for forming a seamless cross-oriented film comprising:
   tubular-film-producing means for forming a thermoplastic synthetic resin tubular film;
   means for maintaining the temperature of said tubular film below the melting point yet above the secondary transition temperature thereof, disposed downstream of said producing means;
   twist-preventing means, in contact with said film for pressing and feeding said tubular film in the film-forming direction, disposed at an axial position of said apparatus substantially coincident with said temperature maintaining means and which includes a fixed mandrel adapted to be disposed within said tubular film and in contact therewith and at least three feed rolls provided, within at least one plane disposed at an axial position corresponding to that of said fixed mandrel, externally of said tubular film and in contact therewith so that said tubular film may not undergo slip with respect to any cross-orientation force created by means of drawing and lateral rotation operations;
   cross-orientation means, disposed immediately downstream of said twist-preventing means, for continuously rotating said tubular film, relative to the film-forming direction or laterally thereof while said film is moving in said film-forming direction, at a peripheral speed of at least twice as fast as the feed speed of said twist-preventing means; and
   a take-up device, disposed downstream of said cross-orientation means, for imparting a drawing speed, of at least twice as fast as the feeding speed of said twist-preventing means, to said cross-orientation means so as to thereby successively flatten said tubular film into two layers, said take-up device including guide rolls and nip rolls.
2. The apparatus as set forth in claim 1, wherein:
   said cross-orientation means includes a rotary mandrel; and,
   the peripheral surface of said rotary mandrel is provided with vertically extending parallel bulged portions.

* * * * *